(12) United States Patent
Weissert

(10) Patent No.: US 6,190,048 B1
(45) Date of Patent: Feb. 20, 2001

(54) COMPLIANT FOIL FLUID FILM RADIAL BEARING

(75) Inventor: Dennis H. Weissert, Sunland, CA (US)

(73) Assignee: Capstone Turbine Corporation

( * ) Notice: Under 35 U.S.C. 154(b), the term of this patent shall be extended for 0 days.

(21) Appl. No.: 09/195,354

(22) Filed: Nov. 18, 1998

(51) Int. Cl.[7] .................................................. F16C 17/03
(52) U.S. Cl. ............................................. 384/103; 384/905
(58) Field of Search .................................. 384/103, 905, 384/278, 104, 106

(56) References Cited

U.S. PATENT DOCUMENTS 4,502,795   3/1985   Klaass et al. .
4,555,187   11/1985   Klaass et al. .
4,950,089 * 8/1990   Jones ..................................... 384/103

* cited by examiner

Primary Examiner—Lenard A. Footland
(74) Attorney, Agent, or Firm—Irell & Manella LLP

(57) ABSTRACT

A compliant foil fluid film radial bearing having a contoured profile bearing rotor to provide for the greater thermal expansion of the hot end of the compliant foil fluid film radial bearing at operating temperature. The rotor may have a uniform taper over its entire length, may be tapered for a portion of its length, or the taper may vary over the entire length of the bearing rotor.

30 Claims, 3 Drawing Sheets

COMPLIANT FOIL FLUID FILM RADIAL BEARING

TECHNICAL FIELD

This invention relates to the general field of compliant foil fluid film radial bearings and more particularly to an improved radial bearing having a contoured or tapered bearing rotor.

BACKGROUND OF THE INVENTION

Compliant foil fluid film radial bearings are currently being utilized in a variety of high speed rotor applications. These bearings are generally comprised of a bushing, a rotating element such as a rotor or shaft adapted to rotate within the bushing, non-rotating compliant fluid foil members mounted within the bushing and enclosing the rotating element, and non-rotating compliant spring foil members mounted within the bushing underneath the non-rotating compliant fluid foil members. The space between the rotating element and the bushing is filled with fluid (usually air) which envelops the foils.

The motion of the rotating element applies viscous drag forces to the fluid in the converging wedge channels. This results in increases in fluid pressure, especially near the trailing end of the wedge channels. If the rotating element moves toward the non-rotating element, the convergence angle of the wedge channel increases, causing the fluid pressure rise along the channel to increase. Conversely, if the rotating element moves away, the pressure rise along the wedge channel decreases. Thus, the fluid in the wedge channels exerts restoring forces on the rotating element that vary with and stabilize running clearances and prevent contact between the rotating and non-rotating elements of the bearing. Flexing and sliding of the foils causes coulomb damping of any axial or overturning motion of the rotating element of the bearing.

Owing to preload spring forces or gravity forces, the rotating element of the bearing is typically in physical contact with the fluid foil members of the bearing at zero or low rotational speeds. This physical contact results in bearing wear. It is only when the rotor speed is above what is termed the lift-off/touch-down speed that the fluid dynamic forces generated in the wedge channels assure a running gap between the rotating and non-rotating elements.

Compliant foil fluid film radial bearings typically rely on backing springs for preload, stiffness, and damping. The fluid foils are preloaded against the relatively movable rotating element so as to control foil position/nesting and to establish dynamic stability. The bearing starting torque (which should ideally be zero) is directly proportional to these preload forces. These preload forces also significantly increase the rotor speed at which the hydrodynamic effects in the wedge channels are strong enough to lift the rotating element of the bearing out of physical contact with the non-rotating members of the bearing. These preload forces and the high liftoff/touch-down speeds result in significant bearing wear each time the rotor is started or stopped.

Conventional compliant foil fluid film radial bearings operate with extremely small running clearances and moderate, as opposed to low, drag and power consumption. The clearances between the non-rotating fluid foil's minimum film region and the rotating element are typically less than 100 micro-inches at operating conditions.

In some instances, the compliant fluid foil elements may comprise a plurality of individual compliant foils to form a plurality of wedge shaped channels which converge in thickness in the direction of the rotation of the rotor, while in other instances the compliant foils may be formed on a single sheet enveloping the rotor within a cylindrical or lobed bushing.

One of the high speed applications in which these compliant foil fluid film radial bearings are utilized is a gas turbine engine. Such an engine could include a gas turbine and a gas compressor at opposite ends of a shaft with the compliant foil fluid film radial bearing in between. Since hot combustion gases, as high as 1,750 degrees Fahrenheit are expanded in the gas turbine and atmospheric air is compressed in the compressor, there is a high degree of temperature variation between the turbine or hot end of the compliant foil fluid film radial bearing and the compressor or cooler end of the compliant foil fluid film radial bearing. In some instances the hot end of the compliant foil fluid film radial bearing will be as much as 500 degrees Fahrenheit hotter than the cooler end of the compliant foil fluid film radial bearing.

In most cases, the compliant foil fluid film radial bearing will be generally uniform from the turbine end to the compressor end and the bushing and rotor will also be a constant diameter. As a result of the temperature gradient from the hot end to the cooler end of the compliant foil fluid film radial bearing, the bearing's radial play (sway space or running clearance) may be severely restricted at the turbine end of the bearing. The restriction in radial play, the result of greater thermal expansion at the turbine end of the bearing, can cause the bearing to lose load capacity, have an excessively high touch-down speed, have excessive drag, have excessive power consumption, or be forced to operate at an unacceptable temperature due to self heating. All of the above will adversely impact bearing life and reliability.

U.S. Pat. Nos. 4,502,795 issued Mar. 5, 1985, and 4,555,187 issued Nov. 26, 1985, both entitled Foil Bearing Alignment, propose the use of shims between the compliant foil fluid film radial bearing and the axially extending bore to radially outwardly diverge the surface of the bearing along its axial length. Alternately, an axially varying underspring rib thickness is proposed as is a conical bearing bushing to correct or minimize bearing rotor misalignment and accommodate bearing rotor deflection or tilt.

SUMMARY OF THE INVENTION

The present invention is directed to a compliant foil fluid film radial bearing having a contoured or tapered bearing rotor at ambient temperature. The rotor may have a uniform taper over its entire length or may only be tapered for a portion of its length. Alternately, the taper may vary over the length of the bearing rotor.

In this manner the greater thermal expansion of the hot end of the compliant foil fluid film radial bearing is accommodated such that at operating speed and temperature the bearing rotor will have a relatively constant diameter and the sway space between the bearing and the rotor will be relatively uniform.

BRIEF DESCRIPTION OF THE DRAWINGS

Figure 1:
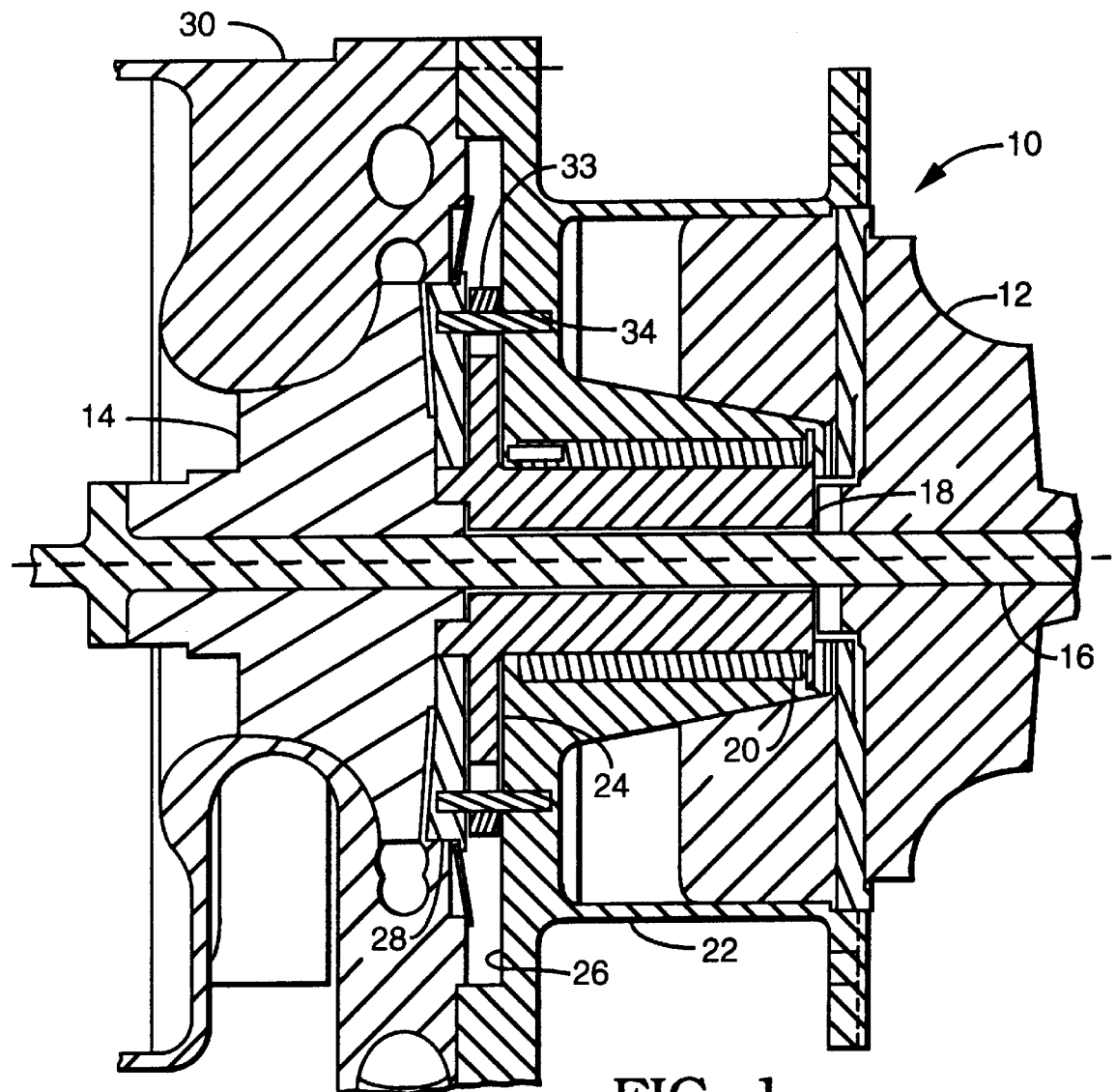
Figure 2:
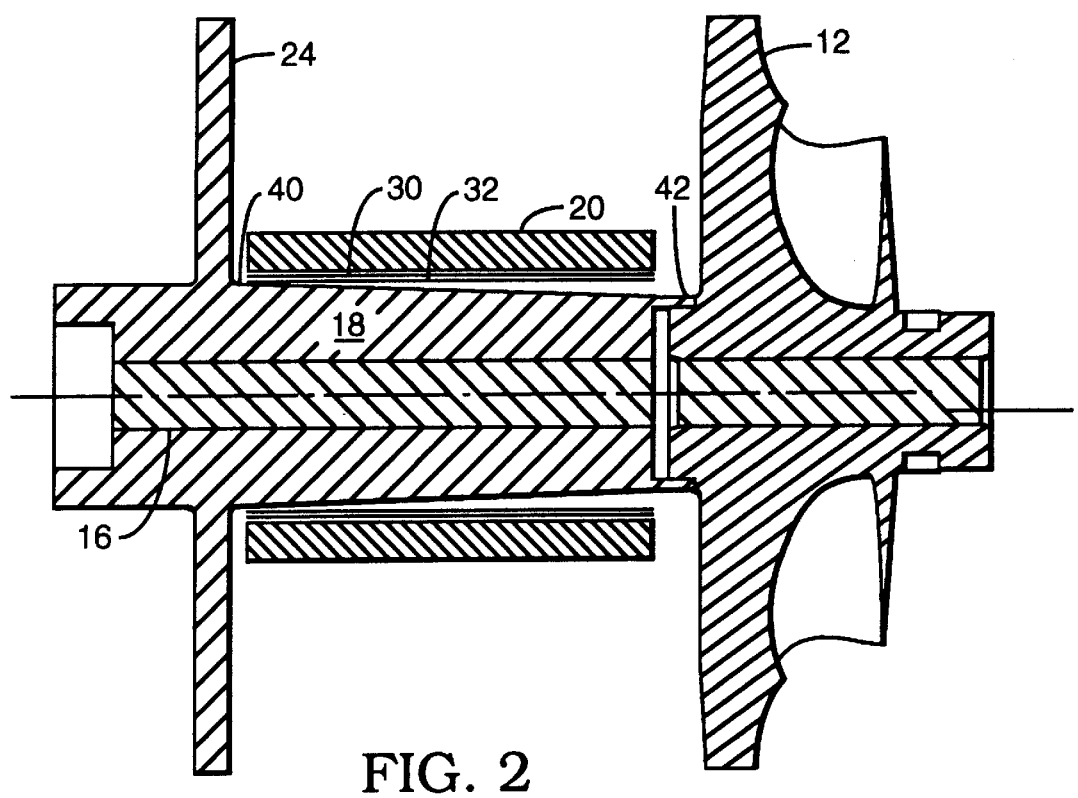
Figure 3:
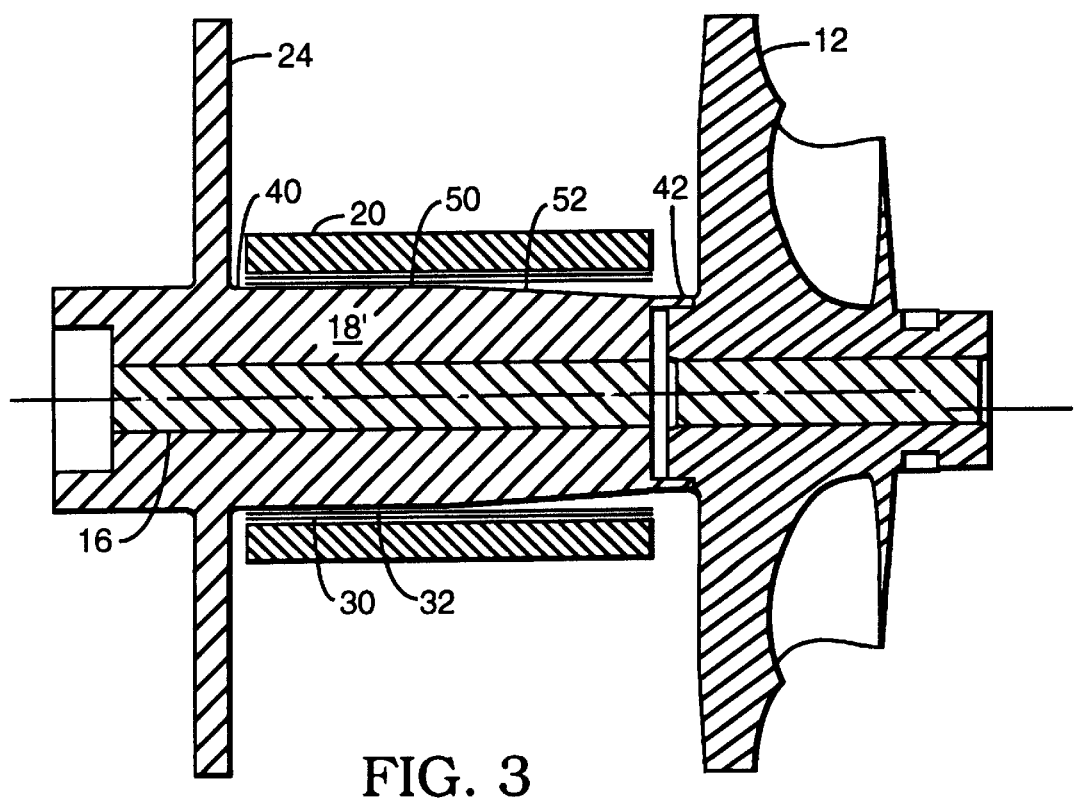
Figure 4:
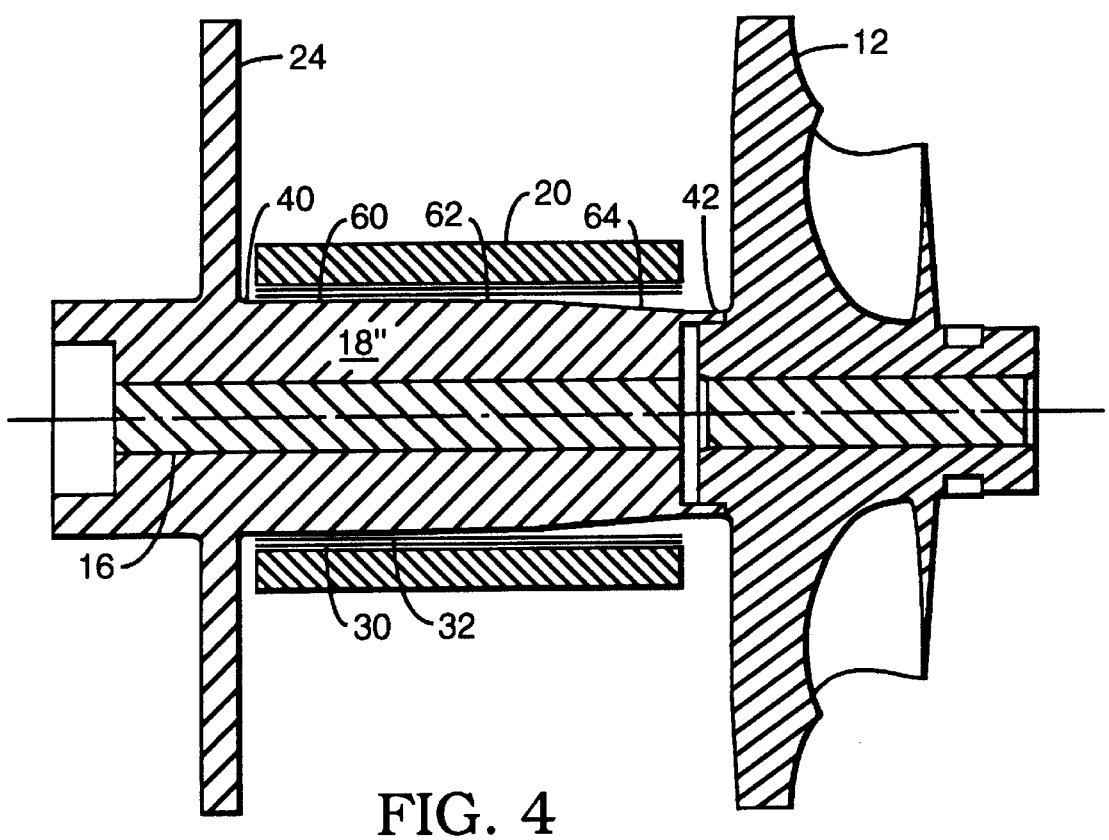

Having thus described the present invention in general terms, reference will now be made to the accompanying drawings in which:

FIG. 1 is a sectional view of a turbomachine having the compliant foil fluid film radial bearing of the present invention;

FIG. 2 is an enlarged sectional view of a portion of FIG. 1 illustrating the compliant foil fluid film radial bearing of the present invention;

FIG. 3 is an enlarged sectional view of a portion of FIG. 1 illustrating an alternate compliant foil fluid film radial bearing of the present invention; and FIG. 4 is an enlarged sectional view of a portion of FIG. 1 illustrating another alternate compliant foil fluid film radial bearing of the present invention.

DETAILED DESCRIPTION OF THE PREFERRED EMBODIMENTS

A turbomachine utilizing the compliant foil fluid film radial bearing of the present invention is illustrated in FIG. 1. The turbomachine 10 generally includes turbine wheel 12 and compressor wheel 14 at opposite ends of a common shaft or tie bolt 16. The thrust and radial bearing rotor 18 is disposed around the tie bolt 16 between the turbine wheel 12 and the compressor wheel 14. A journal bearing cartridge 20 in center bearing housing 22 rotatably supports the bearing rotor 18.

The compressor end of the bearing rotor 18 includes a radially extending thrust disk 24 which extends into a recess 26 in the compressor end of the center bearing housing 22. A bearing thrust plate 28 is disposed on the opposite side of the bearing rotor thrust disk 24. The outer periphery of the compressor end of the center bearing housing 22 engages the compressor housing 30.

A thrust bearing spacer 33 is positioned radially outward from the thrust disk 24 of the bearing rotor 18 and is positioned radially by a plurality of circumferentially spaced pins 34 which are fixed in holes in the recess 26 of the center bearing housing 22 and extend into holes in the thrust bearing plate 28. A thrust bearing fluid foil member and thrust bearing spring foil member are disposed on either side of the bearing rotor thrust disk 24 and thrust bearing spacer 32. On one side, the fluid foil member and spring foil member are positioned in the recess 26 of the center bearing housing 22 and on the other side they are adjacent to the bearing thrust plate 28.

The compliant foil fluid film radial bearing of the present invention is illustrated in FIG. 2. The bearing retainer cartridge 20 mounts a bearing underspring 30 and a bearing foil 32 in conventional fashion around the bearing rotor 18. The bearing rotor 18 is tapered from the compressor or cooler end 40 down to the turbine or hot end 42.

In the alternate compliant foil fluid film radial bearing illustrated in FIG. 3, the bearing rotor 18' includes a generally cylindrical section 50 at the cooler end 40 and a tapered section 52 which extends from the cylindrical section 50 to the hot end 42. The rotor 18" of the alternate compliant foil fluid film radial bearing of FIG. 4 includes a cylindrical cooler end section 60, a central tapered section 62 and a more highly tapered hot end section 64.

Each of FIGS. 2–4 illustrate the bearing rotor 18, 18', or 18" in an at rest, nonoperating, condition at ambient temperature. When the bearing rotor is operated at temperature, the hot end of the rotor will thermally expand such that the bearing rotor will become generally cylindrical at operating temperature since the hot end 42 will expand more than the cooler end 40. Depending upon the temperature profile of the bearing rotor at operating temperature, either of the tapered bearing rotors of FIGS. 2–4 can be utilized.

In other words, instead of starting with a generally cylindrical bearing rotor and ending up with the hot end of the bearing rotor pinching the running clearance at operating conditions, the bearing rotor starts out tapered (smaller) at the hot end and the bearing rotor achieves a generally cylindrical surface at operating conditions which insures a more uniform bearing clearance along the entire bearing rotor. The differential thermal growth, greater at the hot end than at the cooler end, is used to provide a more uniform bearing clearance rather than producing a pinching of the clearance at the hot end.

The interaction of the axially tapered or contoured diameter of the bearing rotor with the change in the rotor's axial temperature profile as it comes up to its operating temperature and with the bearing rotor's thermal coefficient of expansion can assure that the bearing's radial clearance is optimized at operating temperature at all axial locations along the bearing. This can result in a bearing which, under operating conditions, achieves high load carrying capacity, good damping, low running torque, low starting torque, low lift-off/touch-down speeds, low power consumption, and reduced bearing cooling air flow requirements. All of the above are important to the successful manufacture and operation of high speed turbomachinery.

The present invention is equally applicable to hydrodynamic or hydrostatic fluid film radial bearings. Also, while the rotating group has been illustrated as having a gas turbine as the hot rotating component and a gas compressor as the cooler rotating component, there are applications, such as an air cycle turbine system, where the gas compressor would be the hot rotating component and the cooling turbine would be the cooler rotating component. It is only significant that there be a temperature difference between the rotating components for there to be a need for the present invention.

While specific embodiments of the invention have been illustrated and described, it is to be understood that these are provided by way of example only and that the invention is not to be construed as being limited thereto but only by the proper scope of the following claims.

What I claim is:

1. A compliant foil fluid film radial bearing comprising:
   a bearing retainer having a central bore;
   a bearing rotor rotatable within said central bore of said bearing retainer; and
   compliant bearing foils mounted within said central bore of said bearing retainer facing said bearing rotor;
   said bearing rotor having a hot end and a cooler end with the hot end having a smaller diameter than the cooler end at ambient temperature with the smaller diameter hot end thermally expanding more than the cooler end at operating conditions so that said rotor will be substantially cylindrical at operating conditions.

2. The compliant foil fluid film radial bearing of claim 1 wherein the diameter of said bearing rotor decreases generally linearly from said larger diameter cooler end to said smaller diameter hot end at ambient temperature.

3. The compliant foil fluid film radial bearing of claim 1 wherein at ambient temperature the diameter of said bearing rotor is constant from said cooler end to generally the middle of said bearing rotor and decreases from generally the middle of said bearing rotor to said hot end.

4. A compliant foil fluid film radial bearing comprising:
   a bearing retainer having a central bore;
   a bearing rotor rotatable within said central bore of said bearing retainer; and
   compliant bearing foils mounted within said central bore of said bearing retainer facing said bearing rotor;

said bearing rotor having a hot end and a cooler end and also having a contoured profile at ambient temperature to be generally cylindrical at operating conditions, at ambient temperature said bearing rotor includes three sections, a constant diameter section from said cooler end to approximately one-third of the way towards the hot end, a first decreasing tapered section from the constant diameter section to approximately a third of the way from the hot end, and a greater decreasing tapered section from said first decreasing tapered section to the hot end of said bearing rotor.

5. The compliant foil fluid film radial bearing of claim 4 and, in addition, an underspring operably disposed within said central bore of said bearing retainer beneath said compliant bearing foils.

6. The compliant foil fluid film radial bearing of claim 5 wherein said compliant bearing foils are a plurality of foils individually mounted within said central bore of said bearing retainer.

7. The compliant foil fluid film radial bearing of claim 5 wherein said compliant bearing foils are formed on a single sheet extending around said bearing rotor within said central bore of said bearing retainer.

8. The compliant foil fluid film radial bearing of claim 1 and, in addition, an underspring operably disposed within said central bore of said bearing retainer beneath said compliant bearing foils.

9. The compliant foil fluid film radial bearing of claim 8 wherein said compliant bearing foils are a plurality of foils individually mounted within said central bore of said bearing retainer.

10. The compliant foil fluid film radial bearing of claim 8 wherein said compliant bearing foils are formed on a single sheet extending around said bearing rotor within said central bore of said bearing retainer.

11. A compliant foil fluid film radial bearing for a rotating group having a hot rotating component and a cooler rotating component at opposed ends of a common shaft, said bearing comprising:

a bearing retainer operably disposed between said hot rotating component and said cooler rotating component;

a bearing rotor rotatable within of said bearing retainer, said bearing rotor having a cooler end generally disposed in the vicinity of said cooler rotating component and a hot end generally disposed in the vicinity of said hot rotating component; and compliant bearing foils mounted within said bearing retainer facing said bearing rotor;

the hot end of said bearing rotor having a smaller diameter than the cooler end at ambient temperature with the smaller diameter hot end thermally expanding more than the cooler end at operating conditions so that said rotor will be generally cylindrical at operating conditions.

12. The compliant foil fluid film radial bearing of claim 11 and, in addition, an underspring operably disposed within said bearing retainer beneath said compliant bearing foils.

13. The compliant foil fluid film radial bearing of claim 12 wherein said compliant bearing foils are a plurality of foils individually mounted within said bearing retainer.

14. The compliant foil fluid film radial bearing of claim 12 wherein said compliant bearing foils are formed on a single sheet extending around said bearing rotor within said bearing retainer.

15. The compliant foil fluid film radial bearing of claim 11 wherein the diameter of said bearing rotor decreases generally linearly from said larger diameter cooler end to said smaller diameter hot end at ambient temperature.

16. The compliant foil fluid film radial bearing of claim 11 wherein at ambient temperature the diameter of said bearing rotor is constant from said cooler end to generally the middle of said bearing rotor and decreases from generally the middle of said bearing rotor to said hot end.

17. A compliant foil fluid film radial bearing for a rotating group having a hot rotating component and a cooler rotating component at opposed ends of a common shaft, said bearing comprising:

a bearing retainer operably disposed between said hot rotating component and said cooler rotating component;

a bearing rotor rotatable within of said bearing retainer, said bearing rotor having a cooler end generally disposed in the vicinity of said cooler rotating component and a hot end generally disposed in the vicinity of said hot rotating component; and compliant bearing foils mounted within said bearing retainer facing said bearing rotor;

said bearing rotor having a contoured profile at ambient temperature to be generally cylindrical at operating temperature, at ambient temperature said bearing rotor includes three sections, a constant diameter section from said cooler end to approximately one-third of the way towards the hot end, a first decreasing tapered section from the constant diameter section to approximately one-third of the way from the hot end, and a greater decreasing tapered section from said first decreasing tapered section to the hot end of said bearing rotor.

18. The compliant foil fluid film radial bearing of claim 17 and, in addition, an underspring operably disposed within said bearing retainer beneath said compliant bearing foils.

19. The compliant foil fluid film radial bearing of claim 18 wherein said compliant bearing foils are a plurality of foils individually mounted within said bearing retainer.

20. The compliant foil fluid film radial bearing of claim 18 wherein said compliant bearing foils are formed on a single sheet extending around said bearing rotor within said bearing retainer.

21. A compliant foil fluid film radial bearing for a gas turbine engine having a gas turbine rotor and a gas compressor rotor at opposed ends of a common shaft, said bearing comprising:

a bearing retainer operably disposed between said gas turbine rotor and said gas compressor rotor;

a bearing rotor rotatable within of said bearing retainer, said bearing rotor having a cooler end generally disposed in the vicinity of said gas compressor rotor and a hot end generally disposed in the vicinity of said gas turbine rotor; and compliant bearing foils mounted within said bearing retainer facing said bearing rotor;

the hot end of said bearing rotor having a smaller diameter than the cooler end at ambient temperature with the smaller diameter hot end thermally expanding more than the cooler end at operating conditions so that said bearing rotor will be generally cylindrical at the operating temperature of said gas turbine engine.

22. The compliant foil fluid film radial bearing of claim 21 wherein the diameter of said bearing rotor decreases generally linearly from said larger diameter cooler end to said smaller diameter hot end at ambient temperature.

23. The compliant foil fluid film radial bearing of claim 21 wherein at ambient temperature the diameter of said bearing rotor is constant from said cooler end to generally the middle of said bearing rotor and decreases from generally the middle of said bearing rotor to said hot end.

24. The compliant foil fluid film radial bearing of claim 21, and, in addition, an underspring operably disposed within said bearing retainer beneath said compliant bearing foils.

25. The compliant foil fluid film radial bearing of claim 24 wherein said compliant bearing foils are a plurality of foils individually mounted within said bearing retainer.

26. The compliant foil fluid film radial bearing of claim 24 wherein said compliant bearing foils are formed on a single sheet extending around said bearing rotor within said bearing retainer.

27. A compliant foil fluid film radial bearing for a gas turbine engine having a gas turbine rotor and a gas compressor rotor at opposed ends of a common shaft, said bearing comprising:

a bearing retainer operably disposed between said gas turbine rotor and said gas compressor rotor;

a bearing rotor rotatable within of said bearing retainer said bearing rotor having a cooler end generally disposed in the vicinity of said gas compressor rotor and a hot end generally disposed in the vicinity of said gas turbine rotor; and compliant bearing foils mounted within said bearing retainer facing said bearing rotor;

said bearing rotor having a contoured profile at ambient temperature to be generally cylindrical at the operating temperature of said gas turbine engine, at ambient temperature said bearing rotor includes three sections, a constant diameter section from said cooler end to approximately one-third towards the hot end, a first decreasing tapered section from the constant diameter section to approximately one-third of the way from the hot end, and a greater decreasing tapered section from said first decreasing tapered section to the hot end of said bearing rotor.

28. The compliant foil fluid film radial bearing of claim 27 and, in addition, an underspring operably disposed within said bearing retainer beneath said compliant bearing foils.

29. The compliant foil fluid film radial bearing of claim 28 wherein said compliant bearing foils are a plurality of foils individually mounted within said bearing retainer.

30. The compliant foil fluid film radial bearing of claim 28 wherein said compliant bearing foils are formed on a single sheet extending around said bearing rotor within said bearing.

* * * * *